Patented Apr. 14, 1953

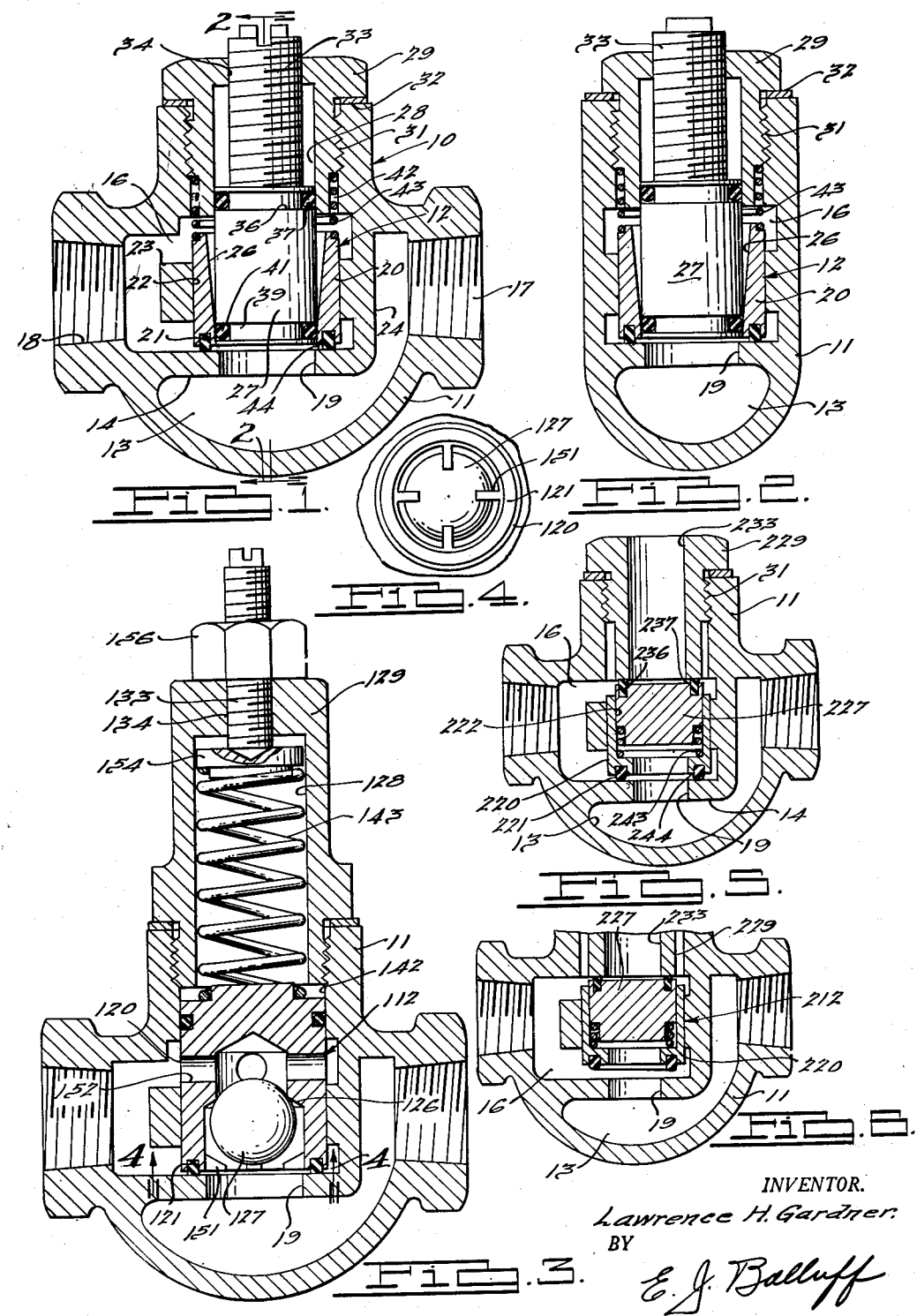

2,634,947

UNITED STATES PATENT OFFICE 2,634,947

FLOW CONTROL VALVE

Lawrence H. Gardner, Lakewood, Ohio

Application January 6, 1948, Serial No. 731

4 Claims. (Cl. 251—120)

This invention relates to valves for controlling the flow of fluid to and from a working cylinder or other pressure actuated device and has particular relation to valves of this type which may be employed for varying the operational characteristics of such cylinders or devices.

Some of the objects of the invention are to provide:

A flow control valve which is simple, efficient, inexpensive, and reliable.

A flow control valve in which the operating mechanism employed therein can be removed and other operating mechanisms substituted therefore in order to provide a valve having different operational characteristics.

A flow control valve in which a valve member and a closure member are operatively associated in such manner as to control the flow of fluid to and from a pressure actuated cylinder or device in such manner that the operational characteristics of the device may be varied to meet different operational requirements.

Other and further objects of the invention will be apparent by reference to the accompanying drawing of which there is one sheet, which, by way of illustration, shows preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawing:

Fig. 1 is a cross-sectional view through a flow control valve illustrating one form of the invention.

Fig. 2 is a cross-sectional view through the valve structure illustrated by Fig. 1 taken in a plane at 90 degrees with respect to Fig. 1 and substantially along line 2—2 of Fig. 1, looking in the direction of the arrows thereon.

Fig. 3 is a cross-sectional view through a flow control valve similar to that illustrated by Fig. 1 except that in Fig. 3 another form of flow control mechanism is employed.

Fig. 4 is a fragmentary elevational view of the lower end of the annular valve member and the closure member employed in the structure illustrated by Fig. 3. Fig. 4 is taken substantially in the plane of line 4—4 on Fig. 3 and looking in the direction of the arrows extending thereacross.

Fig. 5 is a cross-sectional view of a flow control valve similar to the valve illustrated in Figs. 1 to 3, except that in Fig. 5 another form of flow control mechanism is employed.

Fig. 6 is a fragmentary view of the structure disclosed by Fig. 5 when the flow control mechanism is illustrated in a different operative position.

Referring particularly to Figs. 1 and 2, there is employed in the flow control valve 10 illustrated therein, a valve body 11 which is provided internally thereof with the flow control mechanism indicated by the numeral 12. The valve body 11 comprises an inwardly disposed chamber 13 separated by a wall 14 from another inwardly disposed chamber 16. The chamber 13 has a threaded opening 17 which provides communication between the chamber and the exterior of the valve body 11. The threaded opening 17 is adapted to be connected by a fluid-tight conduit, not shown, to a valve control source of fluid under pressure, also not shown. Chamber 16 likewise communicates with the exterior of the valve body 11 through a threaded opening 18 formed in the valve body. The opening 18 is likewise adapted to communicate through a fluid-tight conduit, not shown, with a working cylinder or other fluid actuated device, not shown. It is for the purpose of controlling, regulating, or effecting the operation of such working cylinder or pressure actuated device that the flow control valve 10 is employed.

The wall 14 between the chambers 13 and 16 is provided with an orifice 19 through which fluid is adapted to flow to and from the chambers 13 and 16 when the pressure actuated device is supplied with fluid under pressure for actuating the same or when fluid is exhausted from such pressure actuated device. Within the chamber 16 beyond the orifice 19 is located an annular valve member 20 provided with an annular valve seat 21 adapted to engage the wall 14 when it is desired to close the orifice 19. The annular valve member 20 is slidably disposed in an opening 22 formed in a support 23 projecting from an angularly disposed portion 24 of the wall 14 in parallel relation to the portion of the wall 14 containing the orifice 19. The annular valve member 20 is provided with a frusto-conical opening 26 which is formed interiorly thereof and the cross-sectional area of which increases with the distance from the orifice 19. The smaller part of the opening 26 which is disposed adjacent the orifice 19 is adapted to receive with only slight clearance with respect thereto, one end of a cylindrical closure member 27 which extends beyond the opposite end of the annular valve member 20 and is slidably disposed in a cylindrical opening 28 formed in a removable cap 29. The cap 29 is threaded within a threaded opening formed in the valve body 11 and indicated by the numeral 31. A gasket 32 is disposed between the cap 29 and the valve body 11 to insure a fluid-tight joint therebetween. The cylindrical opening 28 extends considerably beyond the end of the closure member 27, when the flow control mechanism is in the position illustrated by Figs. 1 and 2, in order to provide room for adjusting the position of the closure member 27 with respect to the annular valve member 20. To provide such adjustment, the closure member 27 is provided with a threaded adjusting member 33 which extends through the cap 29 and the end of which is accessible for adjustment from the exterior of the valve body 11. The adjusting member 33 is threaded in the cap 29 at 34. The end of the closure member 27 which is slidably disposed in the cylindrical opening 28 is provided with a circumferential groove indicated at 36 in which an expansible sealing ring 37 is disposed. The ring 37 is adapted to provide a seal between the closure member 27 and the cylindrical opening 28 to prevent leakage of fluid between the closure member 27 and the cylindrical opening 28. The opposite end of the closure member 27 is provided with a similar groove 39 and an expansible sealing ring 41, the ring 41 being likewise adapted to prevent the flow of fluid between the closure member 27 and the interior surface of the annular member 20 when the two members are in one of the possible operating positions of such members.

Formed inwardly with respect to the threads 31 is an elongated annular opening 42 which projects into the valve body 11 toward the adjacent end of the annular valve member 20. One end of a spring 43 is disposed within the opening 42 while the opposite end of the spring 43 is disposed within and against the groove end of the annular valve member 20. The spring 43 tends resiliently to urge the annular valve member 20 into engagement with the wall 14 with the annular valve seat 21 surrounding the orifice 19.

In view of the face that the annular valve seat 21 is of somewhat larger diameter than the closure member 27, thus providing an annular surface therebetween indicated by the numeral 44, it is apparent that the annular valve member 20 will be moved away from the wall 14 when there is a sufficient increase in the fluid pressure within the chamber 13 and the orifice 19 to overcome the compression of the spring 43. Under such circumstances fluid under pressure will flow from the chamber 13 into the chamber 16 between the annular seat 21 and the adjacent surface of the wall 14. Since the spring 43 is employed merely for holding the annular valve member 20 on its seat, it will be apparent that the pressure at which the annular valve member 20 will open for admitting fluid at line pressure to the chamber 16 will be any pressure above the pressure in chamber 16 great enough to overcome the force exerted by the spring 43.

Likewise, the annular valve member 20 will close against the wall 14 thereby limiting the communication between the chambers 13 and 16 whenever the pressure of the fluid in the chamber 13 and the orifice 19 falls below the predetermined pressure required to overcome the spring 43 which previously opposed the movement of the valve member 20 away from the wall 14. When the pressure in the chamber 13 is relieved to such an extent that the pressure in the working cylinder or the pressure actuated device to which the chamber 16 is connected is greater than the pressure in the chamber 13, it is possible by adjusting the position of the closure member 27 to vary the rate at which fluid will return from the chamber 16 to the chamber 13. This may be done by varying the position of the closure member 27 relative to the annular valve member 20.

For example, in the position in which the flow control mechanism is illustrated in Figs. 1 and 2, the gasket 41 practically seals the clearance between the interior of the annular valve member 20 and the adjacent end of the closure member 27. However, the gasket 41 may be moved away from the bottom of the taper 26 until a slight clearance is provided between the interior of the annular valve member 20 and the adjacent end of the closure member 27. Under such circumstances there will be a flow of fluid between the chamber 16 and 13 at a very low rate, and this rate will determine the rate at which the working cylinder or pressure actuated device referred to is exhausted. It will be apparent that it is possible to increase such rate at which the working cylinder or pressure actuated device may be exhausted merely by operating the adjusting mechanism 33 in such a manner as to move the closure member 27 farther away from the wall 14 and the bottom of the tapered opening 26 within the member 20. Such movement of the closure member obviously will increase the clearance between the end of the closure member 27 and the frusto-conical or tapering surface 26 which is formed interiorly of the annular member 20. For example, if the adjusting member 33 is operated in such a way as to move the closure member 27 to its outer limit of movement, it is apparent that the flow of fluid between the chamber 16 and the chamber 13 will reach a maximum possible rate for such device. On the other hand, the movement of the closure member 27 in the opposite direction will produce a minimum rate of flow between the chambers 16 and 13, it being possible to have such rate become zero if such zero rate is desired.

In the structure disclosed by Figs. 3 and 4 the same valve body 11 is employed as is employed in the structures disclosed by Figs. 1 and 2 and the valve body 11 in Fig. 3 is adapted to be connected in the same manner between a working cylinder or pressure actuated device to be controlled and a valve control source of fluid under pressure. The same reference numerals are therefore applied to the valve body 11 in Fig. 3 as are employed in Figs. 1 and 2. In Figs. 3 and 4, however, a somewhat modified flow control mechanism indicated by the numeral 112 is employed. Such flow control mechanism 112 comprises an annular valve member 120 and a closure member 127. The annular valve member 120 is provided with an annular valve seat 121 which engages the wall 14 about the orifice 19. The closure member 127 is in the form of a ball valve which is adapted in one position to rest upon a plurality of radially disposed valve supports 151 which project inwardly from the interior of the annular valve member 120. In the other position of the closure member 127, the ball valve is adapted to seat upon an annular shoulder indicated at 126 which is formed around the interior of the annular valve member 120. Beyond the valve seat 126 the interior of the annular valve member 120 is adapted to communicate with the chamber 16 in the valve member 11 through radial openings indicated at 152.

The annular valve member 120 is slidably disposed within the body 11 in the opening 22 formed in the support 23 of the body 11. The end of the annular valve member 120 which is remote from the wall 14 is slidably disposed in a cylindrical opening 142 which is formed in the body 11 beyond the threads 31. A spring 143 disposed in a cylindrical opening 128 formed in a cap 129, which is secured in the threads 31 formed in the body 11, engages the adjacent end of the annular valve member 120 for the purpose of resiliently urging the annular valve seat 121 into engagement with the wall 14. The opposite end of the spring 143 engages a disc 154 which is mounted on the end of an adjusting member 133 which is threaded into the end of the cap at 134. The adjusting member 133 is provided with a lock nut 156 disposed beyond the end of the cap 129 for the purpose of fixing the adjusting member 133 in any desired position.

It will be apparent that the closure member 127 will engage the annular seat 126 and the annular valve member 120 will be moved away from the wall 14 whenever the pressure of the fluid in the chamber 13 is sufficient to overcome the pre-set spring 143. When such movement of the annular member 120 occurs, fluid will flow through the orifice 19 from the chamber 13 into the chamber 16. It will be apparent that the pressure differential which will cause such movement of the annular member 120 may be varied by adjusting the spring 143 by varying the position of the adjusting member 133 with respect to the cap 129.

The valve structure illustrated by Fig. 3 is particularly applicable as a sequence valve. In other words, a number of such valves may be connected to a single valve controlled source of fluid under pressure with each of the sequence valves controlling a pressure actuated device. By varying the compression of the springs 143 by variously adjusting the adjusting members 133, the various pressure actuated devices may be made to operate in sequence. As the pressure in the line to which all of the sequence valves are connected increases, each of the annular valve members 120 will open whenever the pressure in the line is sufficient to overcome the particular degree of compression affecting the spring 143 of any valve in the system.

When the pressure in the line is relieved the pressure actuated devices will be exhausted by flow of fluid from chambers 16 to chambers 13 through passages 152 and the spaces around the balls within the valve member 120. Under such circumstances the balls 127 will be moved away from the seats 126 and will rest on the supports 151, the valve members 120 being thereafter seated around the orifice 19 by operation of springs 143.

Referring now to the form of the invention disclosed by Fig. 5, the numeral 11 again illustrates a valve body like that indicated by the numeral 11 in all of the preceding figures. Corresponding reference numerals also are applied to all other portions of the valve body.

The annular valve member 220 employed in Figs. 5 and 6 has a cylindrical interiorly disposed opening 222 formed therein and in which is slidably disposed a cylindrical formed closure member 227. A spring 243 is disposed between the annular member 220 and the closure member 227 for the purpose of tending resiliently to urge the annular member 220 into engagement with the wall 14 and the closure member 227 into engagement with the inner end of a cap 229 secured in the threaded opening 31 of the valve body 11. The annular member 220 has an annular valve seat 221 adapted to engage the wall 14 for closing the orifice 19. The opposite end of the closure member 227 likewise is provided with an annular valve seat 237 disposed in a groove 236 formed in the end of the closure member 227. The valve seat 237 is adapted to engage the surface of the inner end of the cap 229 around an exhaust passage 233 formed throughout the length of the cap 229 and through which the exhaust from the pressure actuated device to which the valve is connected is adapted to be by-passed. It will be apparent that allowing the exhaust from the pressure actuated device to escape through the exhaust passage 233 rather than returning to the valve controlled source of fluid under pressure to which the other side of the valve is connected will exhaust the pressure actuated device much more quickly than otherwise would be the case.

In the operation of the structure disclosed by Figs. 5 and 6, it will be apparent that any increase in pressure within the chamber 13 and the orifice 19 which is sufficient to overcome the compression of the spring 243 will quickly move the annular member 220 away from the wall 14 to permit the flow of fluid into the chamber 16. Such increase in pressure within the orifice 19 will of course affect the annular surface 244 surrounding the annular valve seat 221 and will move the annular member 220 before such pressure is fully communicated to the interior of the annular member 220. When the annular member is once moved in this manner, the pressure in the orifice 19 will immediately affect the entire end surface of the annular member 220, both within and without the annular valve seat 221. When the pressures in the chambers 13 and 16 become equalized, then the annular valve seat 221 will again be positioned against the wall 14 for closing the opening 19. During all of such times the fluid pressure within the annular valve member 220 will urge the closure member 227 toward the cap 229 and in which event the exhaust passage 233 will be closed by the annular valve seat 237.

However, when the valve controlled source of fluid presure is actuated or controlled in such manner as to reduce the pressure in the chamber 13 to a predetermined value below the pressure of the fluid in the chamber 16, then atmospheric pressure affecting the surface of the closure member 227 within the area defined by the annular valve seat 237 and a pressure in chamber 16 affecting the end of closure member 227 outside the valve seat 237 will move the closure member 227 away from the cap 229 thereby immediately exhausting the chamber 16 through the exhaust passage 233.

The flow control mechanism employed in the structure disclosed by Figs. 5 and 6 is employed when it is desired to provide a flow control valve that will very rapidly supply the pressure actuated device with fluid under pressure and likewise will very rapidly exhaust the same to the atmosphere.

While I have illustrated and described preferred embodiments of my invention, it is understood that these are capable of modification, and I therefore do not wish to be limited to the precise details set forth, but desire to avail myself of such changes and alterations as fall within the purview of the following claims.

I claim:

1. A flow control valve comprising a valve body having a pair of chambers formed therein, one of said chambers being adapted for connection to a valve controlled source of fluid under pressure and the other being adapted for connection to a pressure actuated device, said chambers being separated by a wall having a flow control orifice formed therein, an annular valve member disposed in one of said chambers and communicating interiorly thereof with said orifice, said annular valve member being provided with an annular valve seat adapted to engage said wall about said orifice for closing said orifice, a closure member disposed inwardly of said annular valve member, said closure member being threadedly secured to said valve body so as to be maintained in a selected fixed position thereof and said annular valve member being movable relative to said closure member in response to a variation in fluid pressure in said orifice, said annular valve member being movable away from said wall for permitting fluid flow in one direction through said valve in response to a higher pressure in said orifice, said annular valve member and said closure member having a clearance space therebetween when said annular valve member is in engagement with said wall, said annular valve member being movable toward said wall for permitting fluid flow in the opposite direction through said clearance space in response to a lower pressure in said orifice, the rate of fluid flow in said opposite direction being controlled by the relative position of said annular valve and closure members, said closure member being movable into a plurality of fixed positions relative to said annular valve member for varying the relative position of said members and thereby the clearance space there-between so as to regulate the fluid flow in said opposite direction.

2. A flow control valve as defined by claim 1 in which said interior communication in said annular valve member increases in cross-sectional area away from said orifice for a substantial distance and the cross-sectional area of said closure is constant, said cross-sectional areas being substantially equal at one position of said members, and in which adjustable means accessible exteriorly of said body is provided for moving said closure member relative to said annular valve member for varying the clearance between said members.

3. A flow control valve as defined in claim 1 in which the clearance space between said closure member and said annular valve member increases as the distance from said orifice increases and in which an expansible gasket is provided between said members for closing said clearance at one position of said closure member relative to said annular valve member.

4. A flow control valve comprising a valve body having a pair of chambers formed therein, one of said chambers being adapted for connection to a valve controlled source of fluid under pressure and the other being adapted for connection to a pressure actuated device, said chambers being separated by a wall having a flow control orifice formed therein, a valve support disposed in spaced relation to said wall, said support having an opening formed therein in alignment with said orifice, an annular valve member disposed in said opening in sliding relation to said support and having a central tapered passage therein which communicates with said orifice and increases in cross sectional area away from said orifice, said annular valve member being provided with an annular valve seat adapted to engage said wall about said orifice for closing said orifice, a closure member disposed within said passage in said annular valve member and having a substantially uniform cross sectional area whereby said annular valve member and said closure have a variable clearance space therebetween when said annular valve member is seated on said wall, said annular valve member being movable relative to said closure member while said closure member remains in a selected fixed position thereof in response to a variation in fluid pressure in said orifice, said annular valve member being movable in said opening away from said wall for permitting fluid flow in one direction through said valve in response to a higher pressure in said orifice, said annular valve member being movable toward said wall for fluid flow in the opposite direction through said clearance space in response to a lower pressure in said orifice, the rate of fluid flow in said opposite direction being controlled by the relative position of said valve and closure members, said closure member being adjustable relative to said annular valve member into a plurality of fixed positions thereof for varying the clearance space between said members so as to regulate the rate of fluid flow in said opposite direction through said clearance space.

LAWRENCE H. GARDNER.

References Cited in the file of this patent

UNITED STATES PATENTS

| Number | Name | Date |
|---|---|---|
| 740,225 | Brown | Sept. 29, 1903 |
| 822,023 | Schreidt | May 29, 1906 |
| 1,187,385 | Peek | June 13, 1916 |
| 1,288,578 | Hatfield | Dec. 24, 1918 |
| 1,726,102 | Forman | Aug. 27, 1929 |
| 1,835,979 | Ernst | Dec. 8, 1931 |
| 1,850,117 | McMillan | Mar. 22, 1932 |
| 1,994,974 | Wiedmann | Mar. 19, 1935 |
| 2,006,141 | Hussey | June 25, 1935 |
| 2,161,642 | Stroup | June 6, 1939 |
| 2,162,743 | Norbom | June 20, 1939 |
| 2,351,874 | Parker | June 20, 1944 |
| 2,365,892 | McLeod | Dec. 26, 1944 |
| 2,403,029 | Smith | July 2, 1946 |

FOREIGN PATENTS

| Number | Country | Date |
|---|---|---|
| 693,355 | France | of 1930 |